United States Patent [19]

Hirose

[11] Patent Number: 5,794,541
[45] Date of Patent: Aug. 18, 1998

[54] MULTI-DEGREE-OF-FREEDOM TABLE SUPPORT UNIT, AND A MULTI-DEGREE-OF-FREEDOM TABLE MECHANISM

[75] Inventor: Kazuya Hirose, Tokyo, Japan

[73] Assignee: Hihaisuto Seiko Co., Ltd., Tokyo, Japan

[21] Appl. No.: 796,700

[22] Filed: Feb. 6, 1997

[30] Foreign Application Priority Data

Feb. 7, 1996 [JP] Japan .................. 8-020817

[51] Int. Cl.⁶ ............................................. A47F 5/12
[52] U.S. Cl. ............... 108/20; 248/371; 74/490.07; 108/6
[58] Field of Search ............... 248/295.11, 296.1, 248/371; 108/20, 147, 138, 4, 5, 6, 7, 8, 10, 147.19, 147.2; 74/490.07; 269/71, 73, 55, 58

[56] References Cited

U.S. PATENT DOCUMENTS

| | | | |
|---|---|---|---|
| 2,877,830 | 3/1959 | Smith | 248/371 X |
| 4,602,555 | 7/1986 | Bushey | 108/20 X |
| 5,031,547 | 7/1991 | Hirose | 108/20 X |
| 5,163,651 | 11/1992 | Matsumoto | 108/20 X |
| 5,307,676 | 5/1994 | Gutman | 269/71 X |

FOREIGN PATENT DOCUMENTS

| | | | |
|---|---|---|---|
| 6180381 | 6/1994 | Japan | 108/20 |
| 976946 | 11/1982 | U.S.S.R. | 108/6 |

*Primary Examiner*—Peter M. Cuomo
*Assistant Examiner*—Janet M. Wilkens
*Attorney, Agent, or Firm*—Townsend & Banta

[57] ABSTRACT

A multi-degree-of-freedom table support unit U comprising a lengthwise and crosswise motion mechanism with two outer support plates integrally combined with an inner support plate sandwiched therebetween, and with bearings B installed between the inner support plate and outer support plates. A spherical bearing mechanism consisting of a spherical face 5 formed on a surface of the inner support plate having a spherical body 6 slidably engaged with the spherical face. A rod 8 is installed in an opening 7 formed in at least one of the outer support plates, with its tip connected with the spherical body; and a straight motion bearing mechanism for back-and-forth movement of the rod is provided. There is also provided a multi-degree-of-freedom table mechanism, in which support units with the above structure are used to support a stage 14 on a support frame 13, so that the stage 14 can be moved in X, Y and Z directions by driving the rods of the support units back and forth.

18 Claims, 11 Drawing Sheets

MULTI-DEGREE-OF-FREEDOM TABLE SUPPORT UNIT, AND A MULTI-DEGREE-OF-FREEDOM TABLE MECHANISM

BACKGROUND OF THE INVENTION

1. Field of the Invention

The present invention relates in general to a multi-degree-of-freedom table support unit, and more particularly, to a multi-degree-of-freedom table mechanism which can be used with precision measuring instruments, precision processing machines, precision positioning apparatus, etc.

2. Description of the Related Art

In a so-called X-Y moving table in which a stage can be moved against a support frame lengthwise and crosswise, i.e., in the first and second axial directions perpendicular to each other, a pair of one-axis motion mechanisms, each consisting of a pair of straight motion guide bearings and one feed screw mechanism, are placed one on the other. In this apparatus, their moving directions are kept perpendicular to each other, thus allowing a stage to be moved against a support frame as described above.

In an X-Y-Z moving table which allows movement in the third axial direction perpendicular to the first and second axial directions, i.e., height direction, in addition to the lengthwise and crosswise movement as mentioned above, a third one-axis motion mechanism for the third axial direction is included. To allow rotation and to allow the stage to be tilted, a θ-axis motion mechanism can be included.

The above described apparatus have a number of problems, e.g., the number of parts is large, the height from the support frame to the stage is unstably high, the mechanism occupies a large space, time consuming assembly, and it is relatively difficult to accurately assemble the apparatus.

SUMMARY OF THE INVENTION

To solve the above problems, the present invention provides a multi-degree-of-freedom table support unit, comprising a lengthwise and crosswise motion mechanism with two outer support plates integrally combined with an inner support plate sandwiched therebetween, and with bearings installed between the inner support plate and the respective outer support plates; a spherical bearing mechanism is provided which consists of a spherical face formed on a surface of the inner support plate and a spherical body slidably engaging the spherical face. A rod is installed in an opening formed in at least one of the outer support plates, with its tip connected with the spherical body. A straight motion bearing mechanism is also provided for supporting the rod during back-and-forth movement.

The present invention also provides a multi-degree-of-freedom table mechanism for moving a multi-degree-of-freedom stage supported by a support frame, comprising;

a plurality of support units, each of which is composed of a lengthwise and crosswise motion mechanism with two outer support plates integrally combined with an inner support plate sandwiched therebetween. Bearings are installed between the inner support bearing mechanism is provided which consists of a spherical face formed on a surface of the inner support plate and a spherical body slidably engaging the spherical face. A rod is installed in an opening formed in at least one of the outer support plates, with its tip connected with the spherical body. A straight motion bearing mechanism is also provided for supporting the rod during back-and-forth movement.

In one embodiment, all but one of the support units are installed with their rod moving directions kept in a first and second axial direction corresponding to the lengthwise and crosswise directions of a stage. The remaining support unit is installed with its rod moving direction kept in a third axial direction perpendicular to said first and second axial directions.

The outer support plates closer to the stage, of the respective support units, are fixed and supported on the stage side, and members of the straight motion bearing mechanisms are fixed and supported on the support frame side.

The rod back and forth driving mechanisms for the respective support units are provided on the support frame side.

In this structure, a plurality of the support units are provided in parallel at least for one of the first and second axial directions. A plurality of spherical bearing support members are provided in addition to the support unit for the third axial direction. The respective spherical bearing support members can move lengthwise and crosswise, and the support unit provided for the third axial direction is located away from a line passing through said plurality of spherical bearing support members.

The direction of a line passing through the plurality of spherical bearing support members is the first or second axial direction, but as the case may be, it can also be any other proper direction.

In another embodiment, the present invention proposes to substitute all but one of the plurality of spherical bearing support members with support units.

In this embodiment, each of the spherical bearing support members is installed together with the support units in three axial directions, and is combined with a lengthwise and crosswise motion mechanism with two outer support plates integrally combined with an inner support plate held between them. Bearings are installed between the inner support plate and the respective outer support plates. A spherical bearing mechanism is provided comprising a spherical face formed on a surface of the inner support plate and a spherical body slidably engaging the spherical face. A rod is installed in an opening formed in at least one of the outer support plates, with its tip connected with the spherical body. In this construction, the rod is fixed to the support frame, while the outer support plate closer to the stage is fixed to the stage.

In another embodiment there is provided a multi-degree-of-freedom table mechanism for moving a multi-degree-of-freedom stage which is supported by a support frame.

This apparatus comprises a plurality of support units, each of which includes a lengthwise and crosswise motion mechanism with two outer support plates integrally combined with an inner support plate sandwiched therebetween. Bearings are installed between the inner support plate and the respective outer support plates. A spherical bearing mechanism is provided which consists of a spherical face formed on a wall of the inner support plate, and a spherical body slidably engaging the spherical face. A rod is installed in an opening formed in at least either of the outer support plates, with its tip connected to the spherical body. A straight motion bearing mechanism is also provided for supporting the rod during back-and-forth movement.

A plurality of support units can be installed with their rod moving directions kept in the first and second axial directions corresponding to the lengthwise and crosswise directions of the stage. Three or more support units are installed with their rod moving directions kept in the third axial direction perpendicular to the first and second axial directions.

The outer support members of the support units closer to the stage are fixed and supported on the stage side. Members of the straight motion bearing mechanisms are fixed and supported on the support frame side. Rod back and forth driving mechanisms for the support units are provided on the support frame side.

In this embodiment, a plurality of the support units are provided in parallel for at least one of the first and second axial directions, while three or more of the support units are provided for the third axial direction. The three or more support units aligned in the third axial direction are installed without being aligned in the first and second axial directions.

In this embodiment, the bearings can be chosen from ball bearings held by a retainer, a fluid bearing using hydraulic pressure or pneumatic pressure, or magnetic bearings, etc.

In this embodiment, since the rods for maintaining the distances between the support frame and the stage have spherical bearing mechanisms at their tips, the stage can be pivotally rotated at the corresponding portions as desired in the respective first, second and third axial directions.

Furthermore, since the outer support plates comprising the lengthwise and crosswise motion mechanisms and the tips of the rods can move lengthwise and crosswise in certain ranges in the first, second and third axial directions, the rods can be driven back and forth in the respective axial directions. Consequently, when the stage is moved by the tips of rods, some rods can absorb changes in relative position caused by the lengthwise and crosswise movement and pivotal rotation of the stage.

DESCRIPTION OF THE PREFERRED EMBODIMENTS

In the drawings, inner support plate 1 and outer support plates 2a and 2b are integrally combined by sandwiching inner support plate 1 between outer support plates 2a and 2b. Between outer support plates 2a and 2b and inner support plate 1, ball bearings B consisting of a retainer 3 and balls 4 retained thereby are installed to allow inner support plate 1 to move between outer support plates 2a and 2b. This apparatus allows for lengthwise and crosswise motion.

Inner support plate 1 is provided with a spherical face 5 formed at its center, and spherical face 5 is slidably engaged with a spherical body 6, to constitute a spherical bearing mechanism. Outer support plate 2b has an opening 7 formed at its center, and rod 8 installed through opening 7 is connected at its tip with spherical body 6. In this embodiment, spherical body 6 is truncated at the front end and the rear end in the axial direction, to be flat.

Rod 8 extends through cylinder 9. Between cylinder 9 and rod 8, balls 10 movably held along a circulation passage not illustrated, are installed to constitute a straight motion bearing mechanism which supports rod 8 in such a manner that the rod 8 can be moved back and forth in the cylinder 9.

When support unit U having the above structure is used as a component of a table mechanism, cylinder 9 is fixed in a support frame region 11, and outer support plate 2a is fixed to stage region 12. Furthermore, though not illustrated in FIGS. 1 to 3, rod back and forth drive mechanism 15 for driving rod 8 back and forth in cylinder 9 is installed in the support frame, hence in the support frame region 11.

Figure 1:
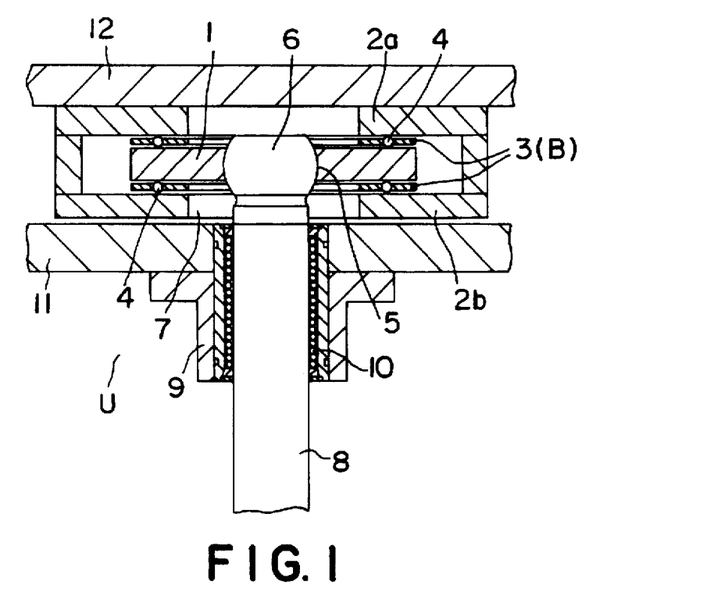
FIG. 1 a vertical partial cross-sectional view showing the multi-degree-of-freedom table support unit of the present invention.
Figure 2:
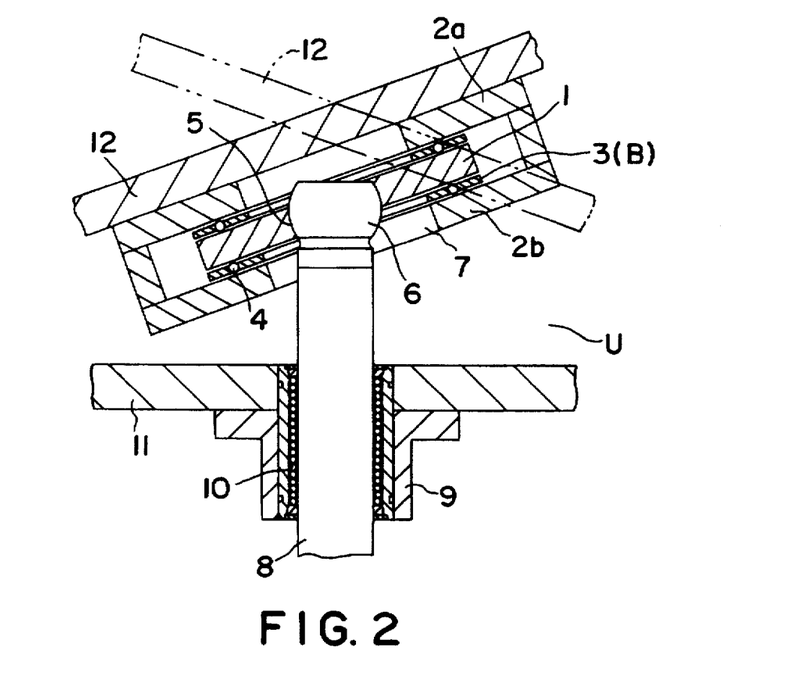
FIG. 2 is a vertical partial cross-sectional view of the multi-degree-of-freedom table support unit of FIG. 1, illustrating several possible positions of the stage.
Figure 3:
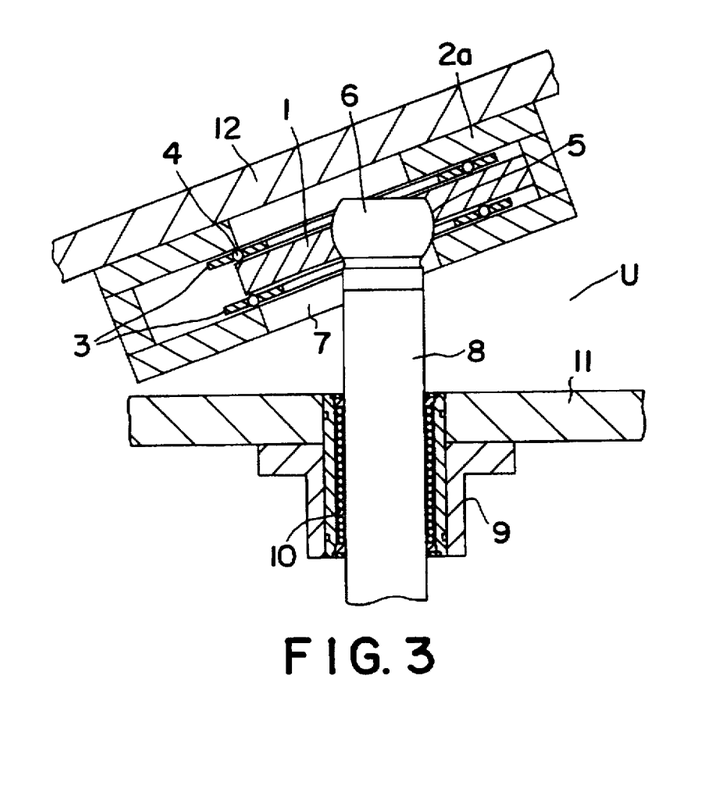
FIG. 3 is a vertical partial cross-sectional view showing the apparatus of FIGS. 1 and 2 in different position.

In the above structure, if rod 8 is driven upward from the position shown in FIG. 1, stage region 12 can be driven apart from support frame region 11 as illustrated in FIG. 2. At a proper position with stage region 12 spaced from support frame region 11, as in FIG. 2, stage region 12 can then be tilted up to a predetermined angle with respect to the longitudinal axis of rod 8. As illustrated in FIG. 3, the central position of outer support plates 2a and 2b can be moved lengthwise and crosswise with respect to the tip of rod 8.

However, in the example shown in FIG. 1, when rod 8 is fixed at a proper position, stage region 12 cannot be driven against support frame region 11 in the axial direction of rod 8.

By using support unit U described above, a multi-degree-of-freedom table mechanism can be easily constructed as described below.

Figure 4:
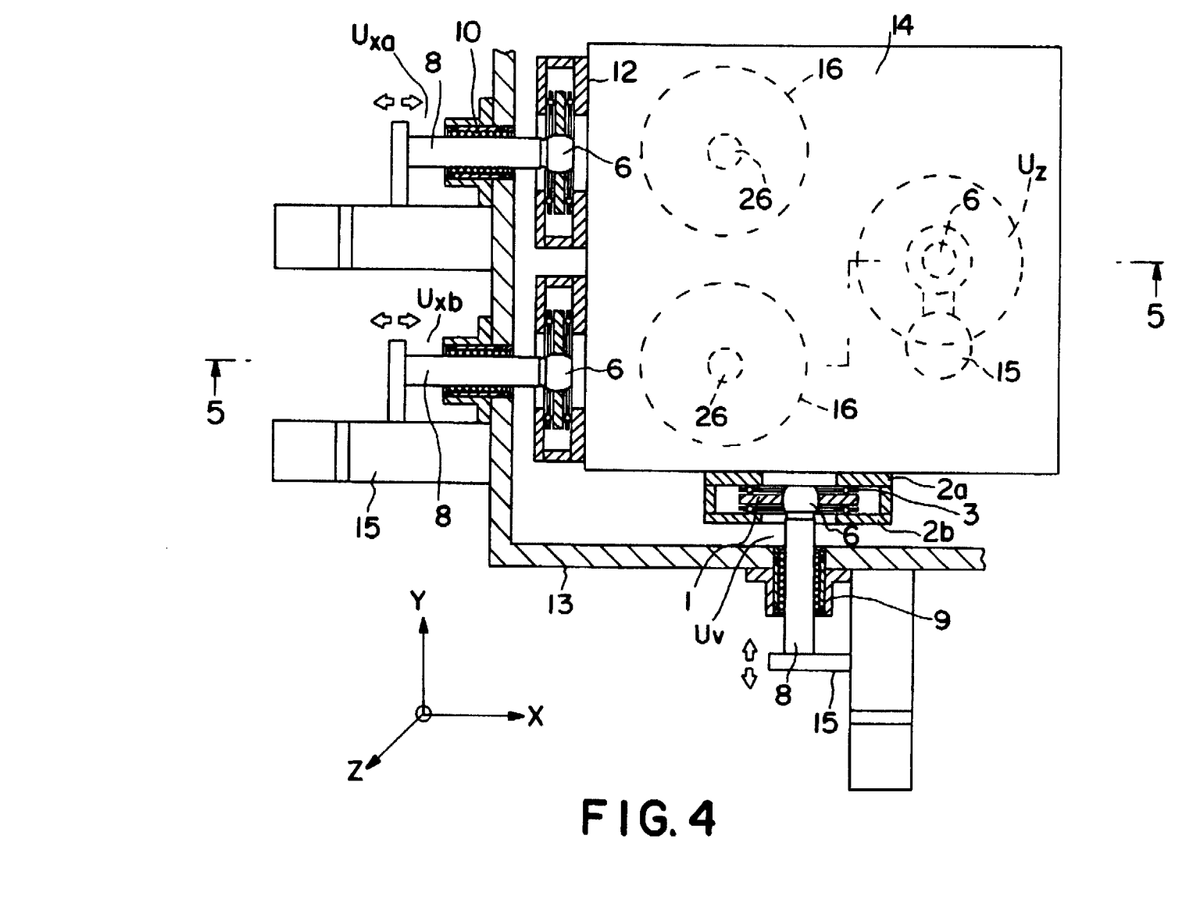
FIG. 4 is a partially cutaway plan view showing a four-degree-of-freedom table mechanism of the present invention.
Figure 5:
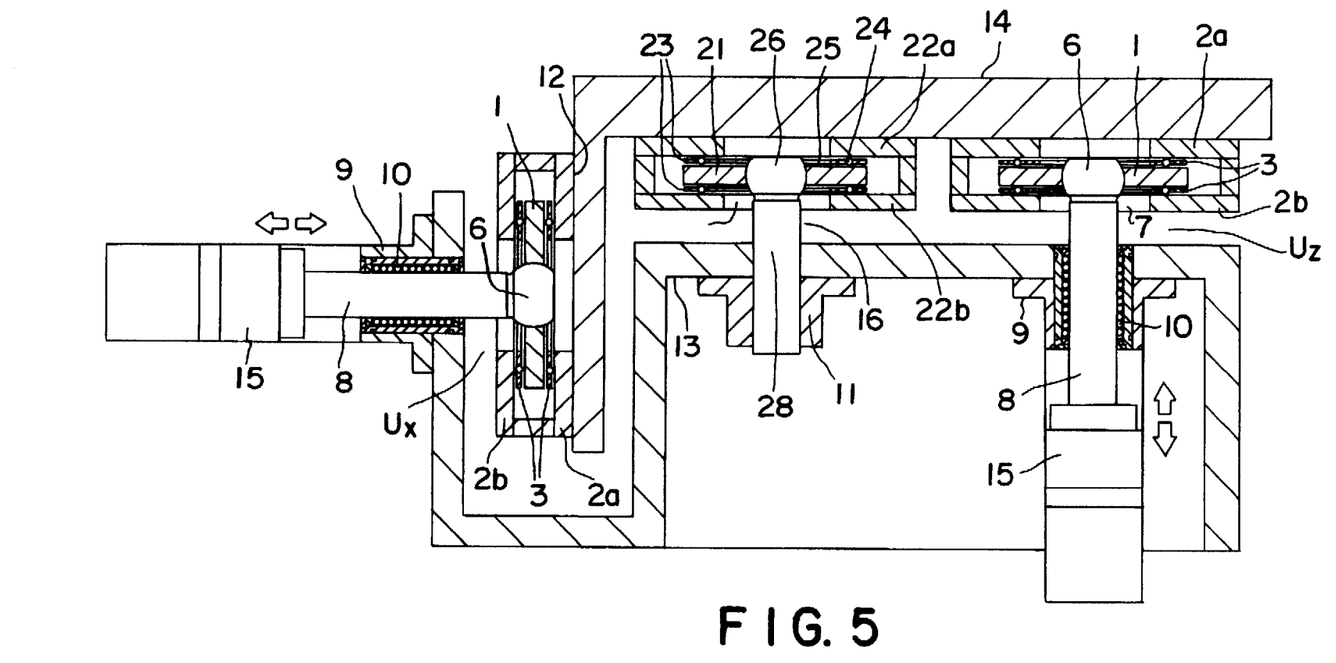
FIG. 5 is a section view taken along line A—A of FIG. 4.

FIGS. 4 and 5 illustrate a preferred embodiment of a four-degree-of-freedom table mechanism using four support units U having the structural components described above. In FIGS. 4 and 5, support frame 13 is shown spaced from stage 14. Stage 14 is supported by support units U on support frame 13. In this preferred embodiment, rods 8 are movable in the directions of first axis (x axis) and second axis (Y axis) corresponding to the lengthwise and crosswise movement of stage 14, and in the direction of third axis (Z axis) perpendicular to the first and second axes. Outer support plates 2A of support units Ux, Uy and Uz are fixed to and support stage 14, and the cylinders as components of the straight motion bearing mechanisms are fixed to support frame 13 for supporting it.

As shown in the representation of coordinate axis, the X axial direction is the horizontal direction in FIGS. 4 and 5, and the Y axial direction is the vertical direction in FIG. 4. The Z axial direction is the vertical direction in FIG. 5. Hereinafter, the first, second and third axes are respectively designated the X, Y and Z axis.

In the above described apparatus, at least in one of the X axis and Y axis, for example, in the X axis in FIG. 4, two support units Ux are installed between support frame 13 and stage 14, with their rods 8 turned in the X axial direction. Hereinafter, as required, support units Ux installed in the X axial direction will be distinguished by adding subscripts a and b.

As illustrated, stage 14 is supported in the Z axial direction by a plurality of spherical bearing support members 16 in addition to support unit Uz, in order that the portions supported by spherical bearing support members 16 cannot be changed in height against support frame 13. Spherical bearing support members 16 can be moved lengthwise and crosswise by the mechanisms described hereinafter. In this embodiment, the direction of a straight line passing through two spherical bearing support members 16 is the Y direction, and the support unit Uz is located at a position apart from the straight line.

The spherical bearing support members 16 have a structure as shown in FIG. 5. The structure is similar to support units U. That is, each of the spherical bearing support members 16 has two outer support plates 22a and 22b integrally combined by sandwiching inner support plate 21 between them. Balls 24 retained by retainers 23 are provided between the inner support plate 21 and the respective outer support plates 22a and 22b, to constitute a lengthwise and crosswise motion mechanism.

Spherical face 25 formed on a surface of inner support plate 21 and spherical body 26 slidably engaged with the spherical face 25 constitute a spherical bearing mechanism. An opening 27 is formed in at least one of the outer support plates, i.e., the outer support plate 22b in this embodiment. A rod 28 extends through opening 27, with the tip of rod 28 connected to spherical body 26. In this embodiment, rod 28 is fixed to support frame region 11. The outer support plates closer to the stage, as components of the lengthwise and crosswise motion mechanisms, are fixed to the stage region 12 to support the stage 14 in such a manner that the stage cannot be changed in height at the portions of the spherical bearing support members 16 against the support frame 13.

On the other hand, for the plurality of support units U, back and forth drive mechanisms 15 for rods 8 are installed in the support frame 13. Each of the back and forth drive mechanisms 15 can be a linear actuator using a hydraulic cylinder to drive the rods 8 back and forth, or may be a mechanism to drive a female thread member engaged with a threaded shaft, etc. Hereinafter, respective back and forth drive mechanisms 15 will be identified by adding subscripts x, y and z corresponding to the respective axes.

The multi-degree-of-freedom table mechanism having the above structure is described below.

FIGS. 4 and 5 illustrate the multi-degree-of-freedom table mechanism when none of the back and forth drive mechanisms 15 are actuated. In this situation, stage 14 is prevented from moving by the support units Ux for X axial direction, the support unit Uy for Y axial direction, and the support unit Uz, and the spherical bearing support members 16 for Z axial direction. As a result, stage 14 is also prevented from pivotally rotating around the respective axes. Therefore, stage 14 is supported in a fixed state on support frame 13, and can support a load.

Figure 6:
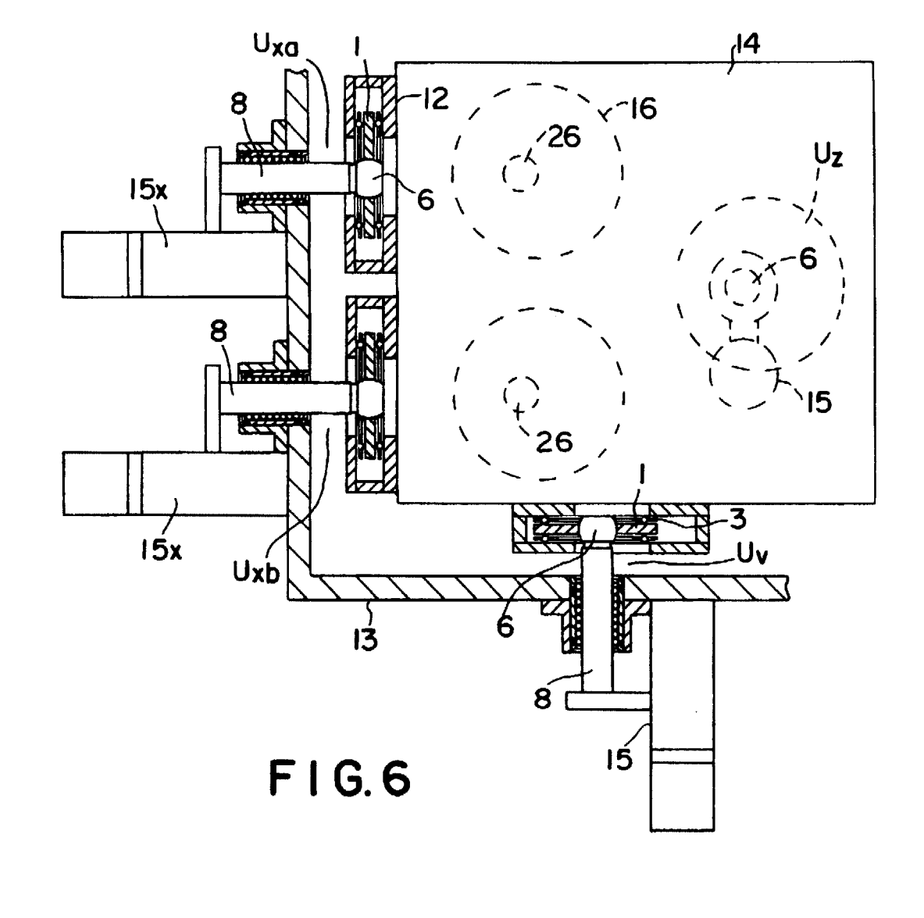
FIG. 6 is a plan view showing the multi-degree-of-freedom table mechanism of FIG. 4, with the position of the stage having been adjusted.

In this embodiment, if the back and forth drive mechanisms 15x of the support units Uxa and Uxb for X axial direction are simultaneously actuated to drive respective rods 8 in the positive direction of X axis, i.e., rightward in the drawing, rods 8 press stage region 12 of stage 14 over spherical bodies 6, spherical faces 5, inner support plates 1, balls 4 and outer support plates 2b. In this case, since support unit Uy for Y axial direction and support unit Uz for Z axial direction can be moved in X axial direction through their lengthwise and crosswise motion mechanisms, stage 14 can be smoothly moved in the positive direction of X axis together with the movement of rods 8, to reach the state shown in FIG. 6. If rods 8 are driven in the negative direction of X axis, stage 14 can be moved in the negative direction of X axis.

In the embodiments provided in FIGS. 4 and 5, rod 8 and stage 14 can be smoothly moved in the positive direction of Y axis by actuating back and forth drive mechanism 15y of support unit Uy for Y axial direction since support units Ux for X axial direction and the support unit Uz for Z direction can be moved in Y direction through their lengthwise and crosswise motion mechanisms. If back and forth drive mechanism 15y is driven in the opposite direction, stage 14 can be moved in the negative direction of Y axis.

Figure 7:
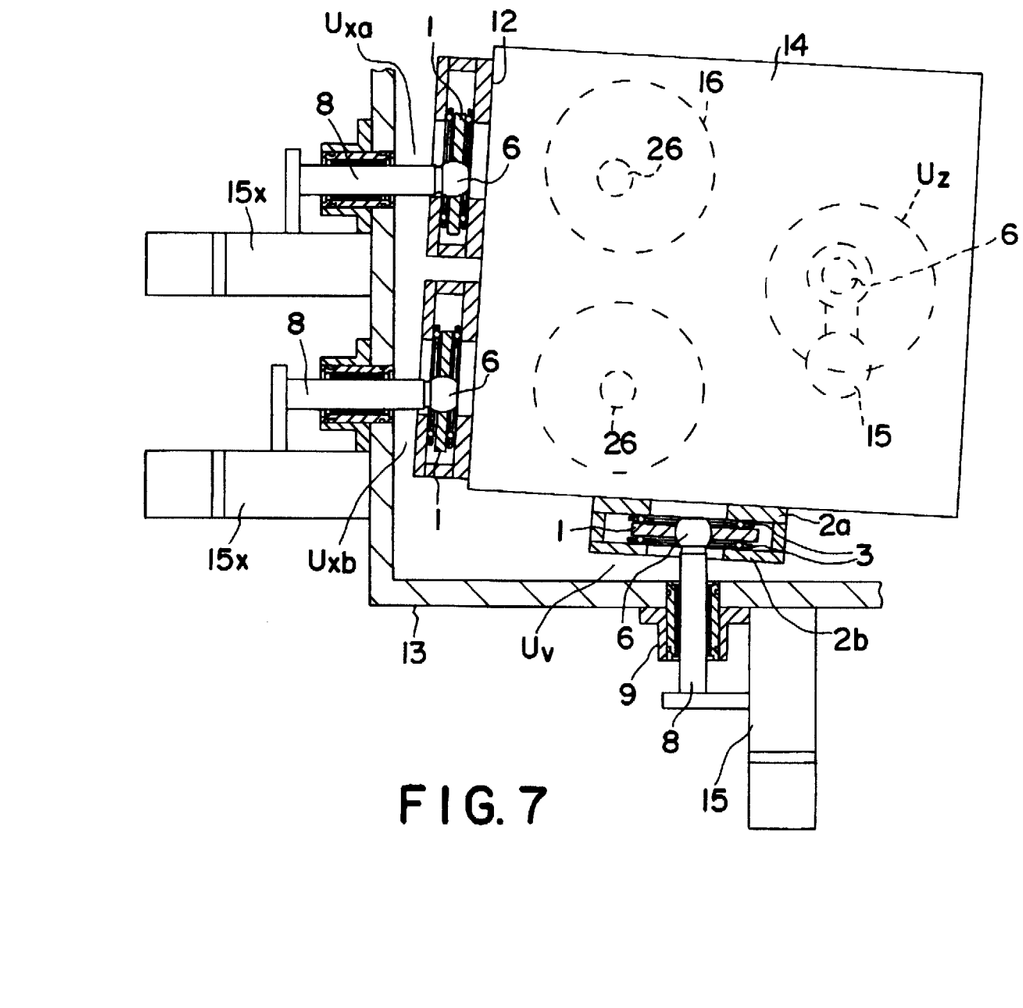
FIG. 7 is a plan view also showing the multi-degree-of-freedom table mechanism of FIG. 4, with the position of the stage having been shifted.
Figure 8:
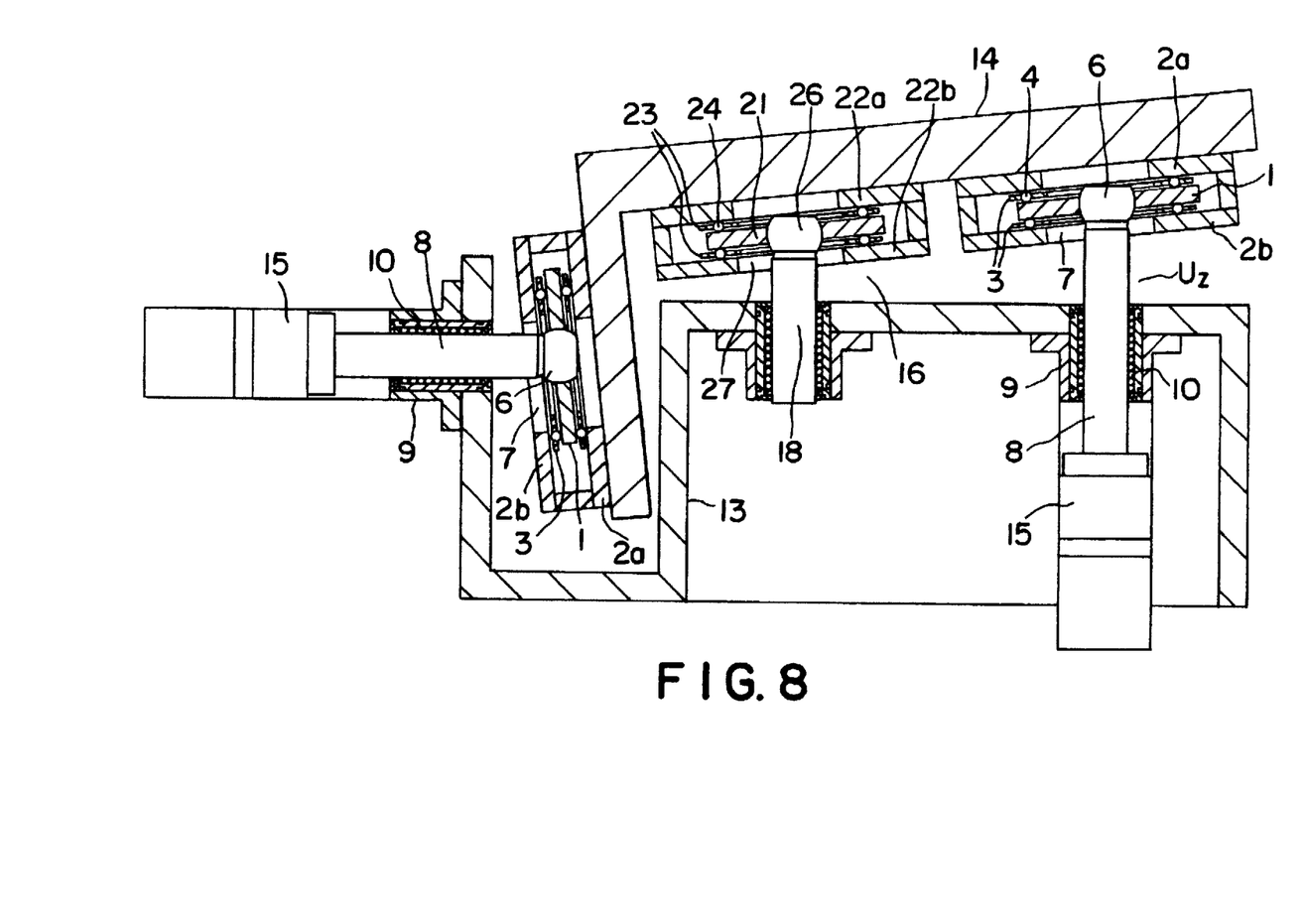
FIG. 8 is a cross-sectional view of the multi-degree-of-freedom table mechanism of FIG. 5, with the position of the stage having been adjusted.

In the embodiments provided in FIGS. 4 and 5, if rod 8 of either support units Uxa or Uxb is driven in the positive direction of the X axis, only the spherical bearing portion of the support unit Uxa or Uxb is moved, and the spherical bearing portion of the other support unit stays in its position. Henceforth, stage 14 is rotated on the plane formed by the X and Y axes, as illustrated in FIG. 7. The rotation of stage 14 on the plane is absorbed by support units Ux and Uy through the pivotal rotation at the spherical bearing mechanisms and the lengthwise and crosswise motion at the lengthwise and crosswise motion mechanisms, and also by the support unit Uz and the spherical bearing support members 16 through the lengthwise and crosswise motion at the lengthwise and crosswise motion mechanisms. In this embodiment, if rods 8 of support units Uxa and Uxb for X axial direction are moved in directions opposite to each other, stage 14 can be rotated at a larger angle compared to the strokes of rods 8. If rod 8 of support unit Uy for Y axial direction is driven while rods 8 of support units Uxa and Uxb for X axial direction are driven, stage 14 can be rotated around a predetermined point. For example, if the rotation center of stage 14 is set at the center of stage 14, stage 14 can be rotated around the Z axis (or θz axis) passing through the center of stage 14.

As shown in FIGS. 4 and 5, if rod 8 of support unit Uz for Z axis direction is driven in the positive direction of the Z axis, i.e., upward in FIG. 5, the spherical bearing portion of the support unit Uz ascends, causing stage 14 to ascend. Since the spherical bearing portions of the spherical bearing support members 16 are maintained at a certain height and are aligned in the Y axial direction, stage 14 is pivotally rotated to tilt around the Y axis (or θy axis) with the spherical bearing portions of the spherical bearing support members 16 as the pivot.

If the direction of the straight line passing through the plurality of spherical bearing support members 16 is in the X direction, stage 14 is pivotally rotated to tilt around the X axis (or θx axis) perpendicular to the Y axis. If the direction of the straight line passing through the plurality of spherical bearing support members 16 is set in a proper direction other than the X axial direction or the Y axial direction, stage 14 can be rotated to tilt around that direction.

The movements of portions of stage 14 corresponding to support units Uxa and Uxb for X axial direction and support unit Uy for Y axial direction can be absorbed by the lengthwise and crosswise motion mechanisms and the spherical bearing mechanisms of the respective support units U.

As described above and shown in FIGS. 4 to 8, stage 14 can be moved in the X and Y axial directions, and can be rotated to tilt around the Z axis (or θz axis) and either the X or Y axial direction, thus providing a four-degree-of-freedom table mechanism.

If all but one of spherical bearing support members 16 of the embodiments shown in FIGS. 4 to 8 are replaced by support units U, the portion at which stage 14 is maintained at a certain height by the remaining one spherical bearing support member 16 is not a straight line, but a point. Furthermore, since a number of support units Uz for Z axial direction is needed, stage 14 can be moved in X and Y axial directions, pivotally rotated around Z axis (or θz axis), and pivotally rotated to tilt around X and Y axes (θx and θy). This embodiment provides a five-degree-of-freedom table mechanism.

Figure 9:
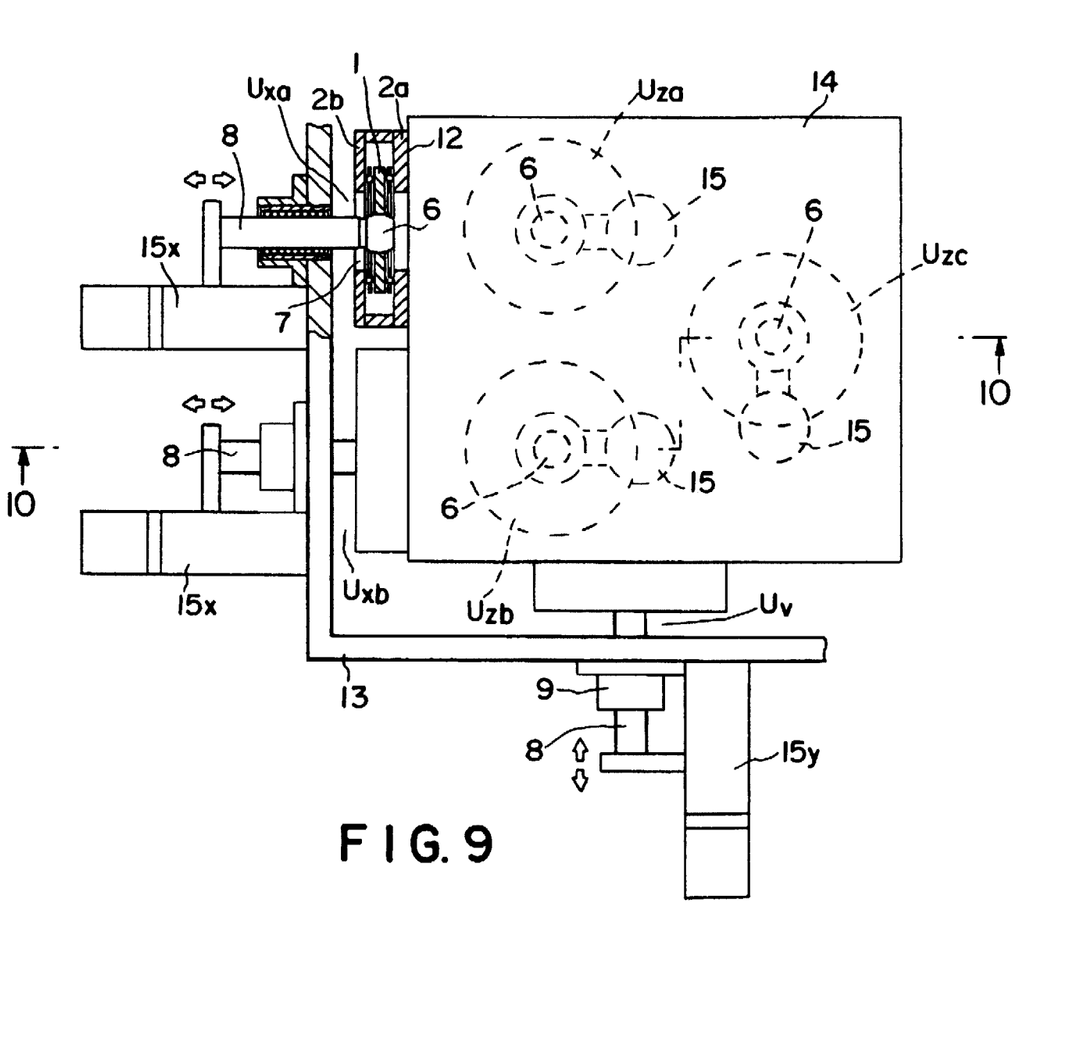
FIG. 9 is a partially cutaway plan view of another embodiment of the present invention showing a multi-degree-of-freedom table mechanism using support units.
Figure 10:
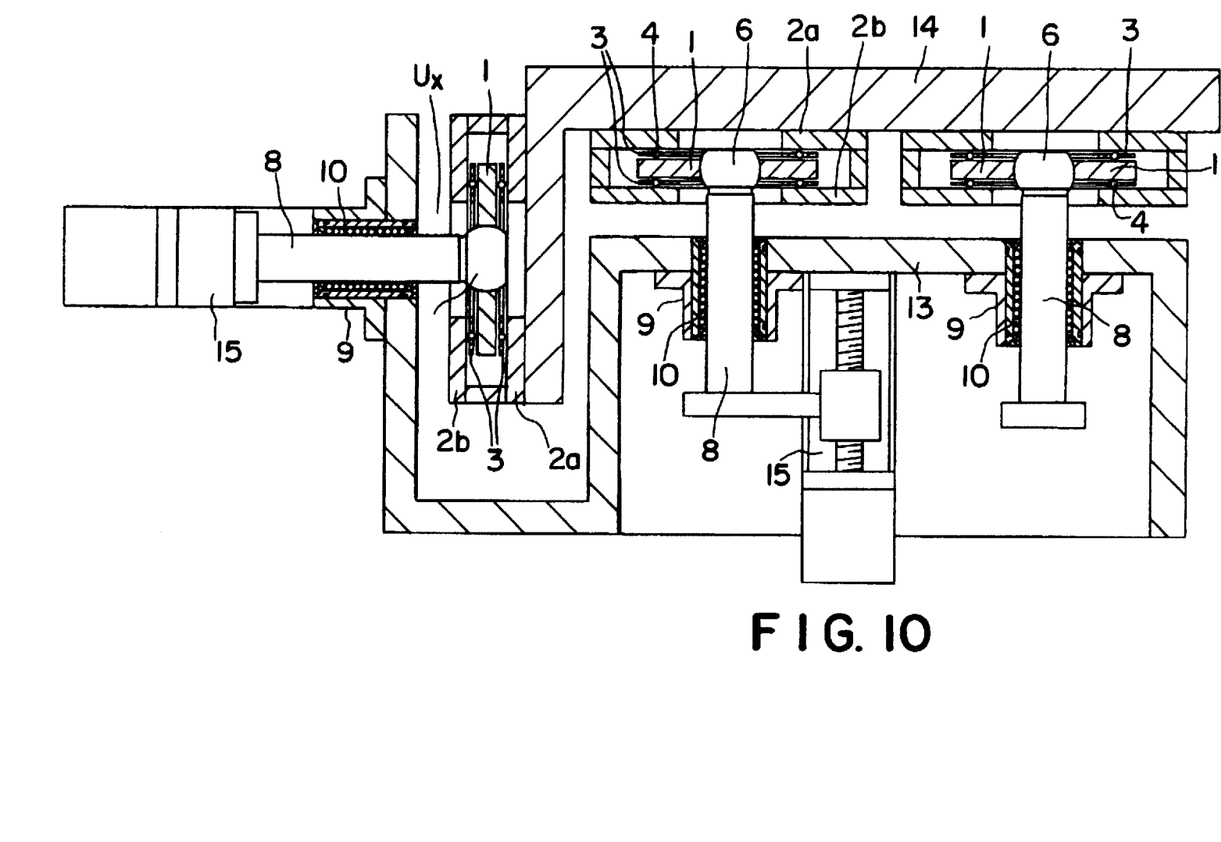
FIG. 10 is a sectional view taken along line B—B of FIG. 9.
Figure 11:
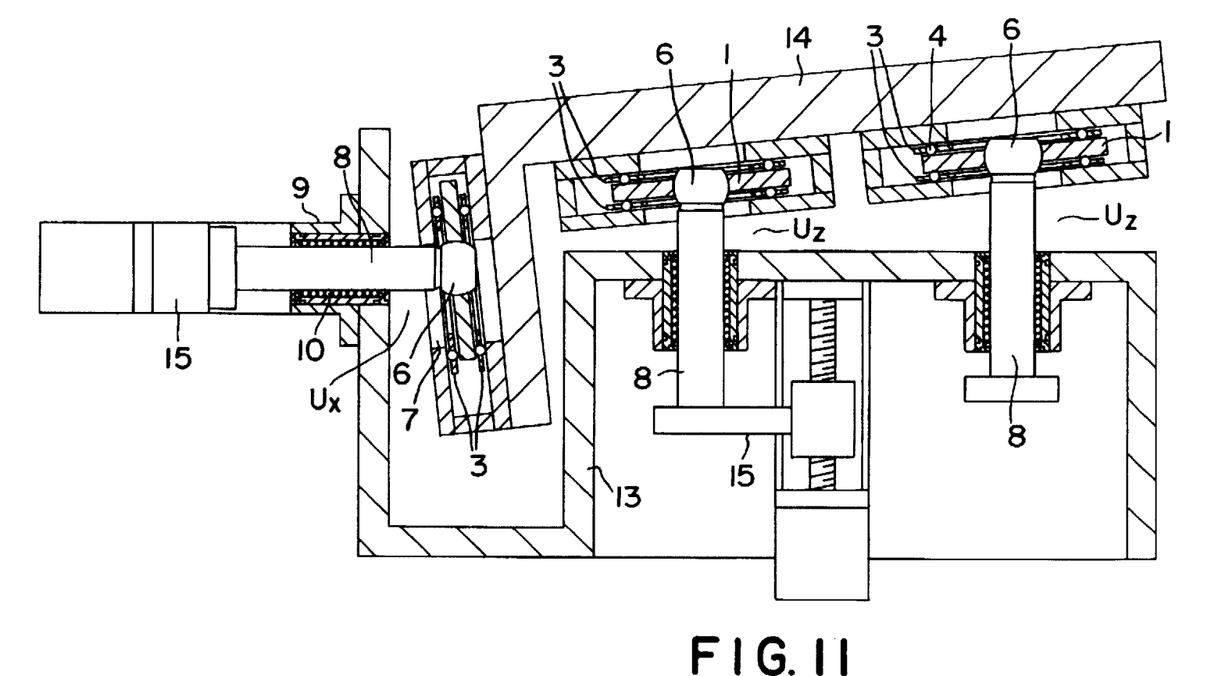
FIG. 11 is a cross-sectional view of the table mechanism of FIG. 9, illustrating the position of the stage and rods in different positions.

FIGS. 9 to 11 provide a six-degree-of-freedom table mechanism.

In this embodiment, support units U for the X and Y axial directions are the same as those in the table mechanism previously described. However, for the Z axial direction, three support units Uz are provided to form an isosceles triangle, and two support units Uza and Uzb on the base of the isosceles triangle are aligned in Y axial direction. Each of the support units Uz is provided with back and forth drive mechanism 15.

In this construction, if the back and forth drive mechanisms 15 of all the support units Uza, Uzb and Uzc for Z axial direction are simultaneously actuated to move rods 8 by an equal distance in the positive or negative direction of the Z axis, stage 14 can be moved in parallel in the Z axial direction. In this case, the dislocation of stage 14 at the portions corresponding to support units Uxa and Uxb for X axial direction and the support unit Uy for Y axial direction can be absorbed by the lengthwise and crosswise motion mechanisms of the respective support units U.

If rod 8 of support unit Uzc corresponding to the vertex of the isosceles triangle is driven in the positive direction of the Z axis while rods 8 of the support units Uza and Uzb aligned in the Y axial direction are maintained at a certain height, the spherical bearing portion of support unit Uzc ascends to raise the corresponding portion of stage 14, but the spherical bearing portions of support units Uza and Uzb are kept at the certain height. As shown in FIG. 11, since the portions maintained at a certain height are aligned in the Y axial direction, stage 14 is pivotally rotated around the Y axis to tilt stage 14 upwardly on the right side of stage 14. If rod 8 of support unit Uzc is driven in the negative direction of the Z axis, the right side of stage 14 can be tilted downwardly.

As previously described, the dislocation of stage 14 at the portions corresponding to support units Uxa and Uxb for the X axial direction and the support unit Uy for the Y axial direction, in response to the tilting of stage 14, can be absorbed by the lengthwise and crosswise motion mechanisms and spherical bearing mechanisms of support units U.

If rods 8 of support units Uza, Uzb and Uzc are driven in the positive direction of the Z axis in such a manner that the heights of the spherical bearing mechanisms of support units Uza, Uzb and Uzc become higher or lower in the order Uza, Uzc and Uzb, stage 14 can be pivotally rotated around the X axis perpendicular to Y axis to tilt. The dislocation of stage 14 at the portions corresponding to support units Uxa and Uxb for the X axial direction and support unit Uy for the Y axial direction can be absorbed by the lengthwise and crosswise motion mechanisms and spherical bearing mechanisms of the respective support units U.

Furthermore, if the pivotal rotation around the X axis and the pivotal rotation around Y axis are performed simultaneously, stage 14 can be tilted in any desired direction.

As provided in the above described embodiment, the six-degree-of-freedom table mechanism shown in FIGS. 9 to 11 can be moved in the X, Y and Z directions and can be pivotally rotated around the X axis (θx axis), Y axis (θy axis) and Z axis (θz axis).

Figure 12A:
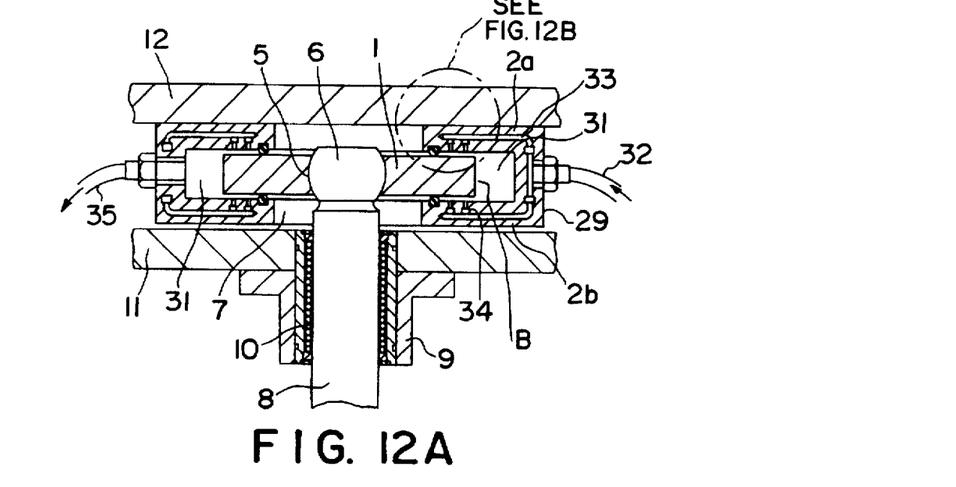
FIG. 12 is a partially cutaway vertical cross-sectional view of the support unit of the present invention, using fluid bearings.
Figure 12B:
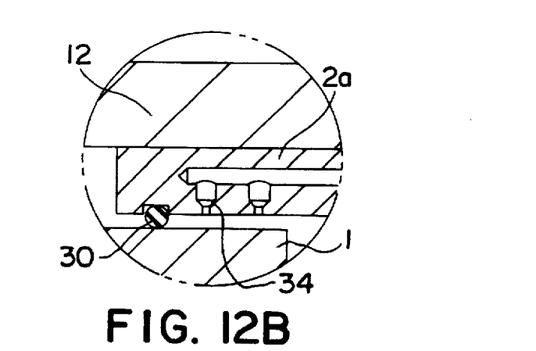
Figure 13:
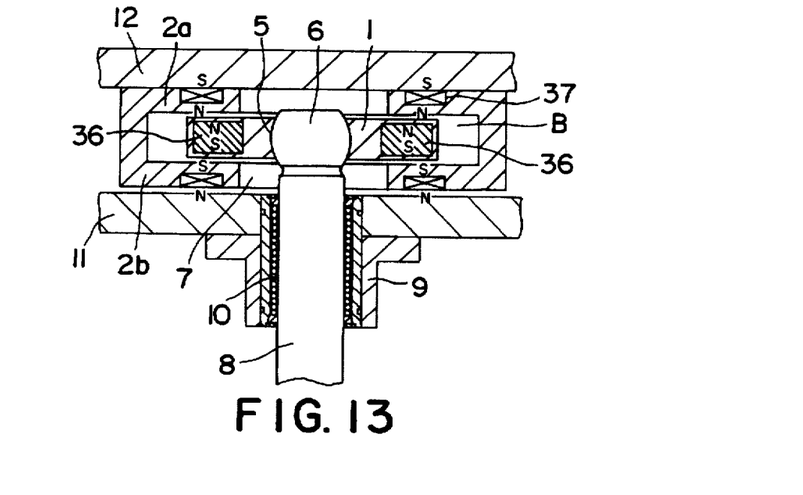
FIG. 13 is a partially cutaway vertical cross-sectional view of the support unit of the present invention, using magnetic bearings.

FIGS. 12 and 13 provide another embodiment of support unit U of the present invention. In this embodiment, only the bearings are different from the embodiments shown in FIGS. 1 to 3.

In FIG. 12, a fluid bearing is used as the bearings B. The two outer support plates 2a and 2b are integrally combined by sandwiching inner support plate 1 between outer support plates 2a and 2b and hermetically sealed by circumferential side plate 29. Inside outer support plates 2a and 2b, O rings 30 are fitted to contact inner support plate 1. As a result, outside O rings 30, an annular fluid filled space 31 is formed by inner support plate 1, outer support plates 2a and 2b and side plate 29. At a point outside side plate 29, a fluid supply pipe 32, extending from a fluid supply device (not illustrated) such as a hydraulic pump or pneumatic pump, is connected. A fluid supply channel 33 communicating to fluid supply pipe 32 is formed in side plate 29 and outer support plates 2a and 2b. From fluid supply channel 33 of outer support plates 2a and 2b, a plurality of nozzles 34 are annularly installed to face inner support plate 1. A fluid discharge pipe 35, communicating with side plate 29 opposite fluid supply pipe 32, is connected to communicate with fluid filled space 31.

In this construction, if the fluid is oil, the oil supplied from the hydraulic pump through fluid supply pipe 32 to fluid supply channel 33 flows toward inner support plate 1 from the plurality of nozzles 34 and goes through the clearances between inner support plate 1 and outer support plates 2a and 2b into fluid filled space 31. The oil is then discharged from fluid filled space 31 through fluid discharge pipe 35, and returned to the hydraulic pump for reutilization. In this embodiment, the oil acts to maintain the respective clearances between inner support plate 1 and outer support plates 2a and 2b by pneumatic pressure. Therefore, outer plates 2a and 2b can be smoothly moved lengthwise and crosswise against inner support plate 1.

Even if air is used as the fluid, outer support plates 2A and 2B can similarly be smoothly moved lengthwise and crosswise against inner support plate 1. Although, in the case of air, the air discharged from fluid filled space 31 through fluid discharge pipe 35 is not returned for reutilization, but rather diffused into the environment.

FIG. 13 illustrates the use of magnetic bearings as bearings B. In inner support plate 1, a permanent magnet 36 is annularly installed to create magnetic poles in the directions shown in FIG. 13. Outer support plates 2a and 2b, permanent magnets or electromagnets 37 are annularly installed to form the same polarity as that of permanent magnet 36 they face.

In this construction, the repulsion between the magnetic poles of the same polarity is utilized to prohibit outer support plates 2A and 2B from contacting inner support plate 1, thus allowing outer support plates 2a and 2b to smoothly move lengthwise and crosswise over inner support plate 1.

The multi-degree-of-freedom table mechanism provided by the present invention has the following advantages over the prior art:

a. The number of parts is small.

b. The height from the support frame to the stage can be kept low.

c. The mechanism does not occupy a large space.

d. Assembling requires less manhours.

e. It is easy to achieve a high assembling accuracy.

What is claimed is:

1. A multi-degree-of-freedom table support unit, comprising a lengthwise and crosswise motion mechanism having two outer support plates integrally combined with an inner support plate sandwiched therebetween, bearings installed between said inner support plate and said outer support plates; spherical bearing mechanism comprising a spherical face formed on a surface of said inner support plate and a spherical body slidably engaging said spherical face; a rod installed in an opening formed in at least one of said outer support plates, with a tip of said rod connected with said spherical body; and a straight motion bearing mechanism supporting said rod and providing for back-and-forth movement of said rod.

2. The multi-degree-of-freedom table support unit according to claim 1, wherein said bearings are ball bearings comprising a retainer and balls retained therein.

3. The multi-degree-of-freedom table support unit according to claim 1, wherein said bearings are fluid bearings using hydraulic or pneumatic pressure.

4. The multi-degree-of-freedom table support unit according to claim 1, wherein said bearings are magnetic bearings.

5. A multi-degree-of-freedom table mechanism moving a stage supported by a support frame wherein said stage has multi-degrees-of-freedom and lengthwise and crosswise directions, said table mechanism comprising:

a plurality of support units, each of which comprises a lengthwise and crosswise motion mechanism having two outer support plates integrally combined with an inner support plate sandwiched therebetween, bearings installed between said inner support plate and said outer support plates; spherical bearing mechanism comprising a spherical face formed on a surface of said inner support plate and a spherical body slidably engaging said spherical face; a rod installed in an opening formed in at least one of said outer support plates, with a tip of said rod connected with said spherical body; and a straight motion bearing mechanism supporting said rod; and providing for back-and-forth movement of said rod;

all but one of the support units having said back-and-forth movement of said rod maintained in first and second axial directions corresponding to said lengthwise and crosswise directions of said stage, while a remaining support unit has said back-and-forth movement of said rod maintained in a third axial direction perpendicular to said first and second axial directions;

said outer support plates of the respective support units which are closer to the stage, are fixed to and support said stage, and members of said straight motion bearing mechanisms are fixed to said support frame;

back and forth driving mechanisms for said rods in respective support units being provided on the support frame;

wherein a plurality of the support units are provided in parallel at least for one of said first and second axial directions; a plurality of spherical bearing support members are provided for the third axial direction; the respective spherical bearing support members being movable lengthwise and crosswise; and the support unit provided for said third axial direction being spaced from a line passing through said plurality of spherical bearing support members.

6. The multi-degree-of-freedom table mechanism according to claim 5, wherein the direction of the line passing through said plurality of spherical bearing support members corresponds to said first or second axial direction.

7. The multi-degree-of-freedom table mechanism according to claim 6, wherein all but one of said plurality of spherical bearing support members are substituted by support units.

8. The multi-degree-of-freedom table mechanism according to claim 6, wherein each of said spherical bearing support members comprises a lengthwise and crosswise motion mechanism having two outer support plates integrally combined with an inner support plate sandwiched therebetween, and having bearings installed between said inner support plate and said outer support plates; a spherical bearing mechanism comprising a spherical face formed on a surface of said inner support plate and a spherical body slidably engaging with said spherical face; and a rod installed in an opening formed in at least one of said outer support plates, with a tip of said rod connected to said spherical body; wherein said rod is fixed to the support frame while a outer support plate closer to said stage is fixed to the stage.

9. The multi-degree-of-freedom table mechanism according to claim 5, wherein all but one of said plurality of spherical bearing support members are substituted by support units.

10. The multi-degree-of-freedom table mechanism according to claim 7, wherein each of said spherical bearing support members comprises a lengthwise and crosswise motion mechanism having two outer support plates integrally combined with an inner support plate sandwiched therebetween, and having bearings installed between said inner support plate and said outer support plates; a spherical bearing mechanism comprising a spherical face formed on a surface of said inner support plate and a spherical body slidably engaging said spherical face; and a rod installed in an opening formed in at least one of said outer support plates, with a tip of said rod connected to said spherical body; wherein said rod is fixed to the support frame while a outer support plate closer to said stage is fixed to the stage.

11. The multi-degree-of-freedom table mechanism according to claim 5, wherein each of said spherical bearing support members comprises a lengthwise and crosswise motion mechanism having two outer support plates integrally combined with an inner support plate sandwiched therebetween, and having bearings installed between said inner support plate and said outer support plates; a spherical bearing mechanism comprising a spherical face formed on a surface of said inner support plate and a spherical body slidably engaged with said spherical face; and a rod installed in an opening formed in at least one of said outer support plates, with a tip of said rod connected to said spherical body; wherein said rod is fixed to the support frame while an outer support plate closer to said stage is fixed to the stage.

12. The multi-degree-of-freedom table mechanism according to claim 5, wherein the bearings are ball bearings, each consisting of a retainer and balls retained thereby.

13. The multi-degree-of-freedom table mechanism according to claim 5, wherein the bearings are fluid bearings using hydraulic or pneumatic pressure.

14. The multi-degree-of-freedom table mechanism according to claim 5, wherein the bearings are magnetic bearings.

15. A multi-degree-of-freedom table mechanism moving a stage supported by a support frame wherein said stage has a multi-degree-of-freedom and lengthwise and crosswise directions, said table mechanism comprising:

a plurality of support units, each of which comprises a lengthwise and crosswise motion mechanism having two outer support plates integrally combined with an inner support plate sandwiched therebetween, bearings installed between said inner support plate and said outer support plates; a spherical bearing mechanism comprising a spherical face formed on a surface of said inner support plate and a spherical body slidably engaging said spherical face; a rod installed in an opening formed in at least one of said outer support plates, with a tip of said rod connected with said spherical body; and a straight motion bearing mechanism supporting said rod and providing for back-and-forth movement of said rod;

the plurality of support units having said back-and-forth movement of said rod maintained in first and second axial directions corresponding to said lengthwise and crosswise directions of the stage, while at least three additional support units are installed with said back-and-forth movement of their rod being maintained in a third axial direction perpendicular to said first and second axial directions;

said outer support plates of the respective support units which are closer to the stage, are fixed to and support said stage, and members of said straight motion bearing mechanisms, are fixed to said support frame, and;

back and forth driving mechanisms for said rods in respective support units being provided on the support frame;

wherein a plurality of the support units are provided in parallel at least for one direction of said first and second axial directions, while the three or more support units provided for the third axial direction are installed without being aligned in said first and second axial directions.

16. The multi-degree-of-freedom table mechanism according to claim 9, wherein the bearings are ball bearings, each consisting of a retainer and balls retained thereby.

17. The multi-degree-of-freedom table mechanism according to claim 9, wherein the bearings are a fluid bearing using hydraulic or pneumatic pressure.

18. The multi-degree-of-freedom table mechanism according to claim 9, wherein the bearings are magnetic bearings.

* * * * *